United States Patent [19]

Suzuki et al.

[11] Patent Number: 5,365,802
[45] Date of Patent: Nov. 22, 1994

[54] OPERATING DEVICE FOR ACCELERATOR

[75] Inventors: Kazuhiro Suzuki, Nishinomiya; Eriya Harada; Akira Minoura, both of Sakai, all of Japan

[73] Assignees: Nippon Cable System Inc., Takarazuka; Kubota Ltd., Osaka, both of Japan

[21] Appl. No.: 103,515

[22] Filed: Aug. 9, 1993

[30] Foreign Application Priority Data

Aug. 10, 1992 [JP] Japan ................... 4-212800

[51] Int. Cl.$^5$ ................ G05G 11/00; G05G 1/14; G05G 7/10
[52] U.S. Cl. .................... 74/482; 74/479 R; 74/481; 74/500.5; 74/501.6; 74/502.6
[58] Field of Search ............... 74/479 R, 480 R, 481, 74/482, 480 B, 500.5, 501.6, 502.6

[56] References Cited

U.S. PATENT DOCUMENTS 2,977,816  4/1961  Rice ................... 74/481

FOREIGN PATENT DOCUMENTS

| | | | |
|---|---|---|---|
| 58-142415 | 8/1983 | Japan | 74/479 |
| 58-210336 | 12/1983 | Japan . | |
| 60-85228 | 5/1985 | Japan | 74/482 |
| 60-87725 | 6/1985 | Japan . | |
| 2-61054 | 12/1990 | Japan . | |
| 3-21732 | 3/1991 | Japan . | |

*Primary Examiner*—Allan D. Herrmann
*Attorney, Agent, or Firm*—Armstrong, Westerman, Hattori, McLeland & Naughton

[57] ABSTRACT

An operation device for an accelerator composed of an output pulley, having an engaging latch and two engaging projections, for winding an output cable; a first pulley having a "C" shaped first engaging hole, for winding a first cable; a second pulley having a "C" shaped second engaging hole, for winding a second cable; and an accelerator lever having an engaging piece. The first engaging projection is moved within the first engaging hole and the second engaging projection is moved within the second engaging hole. The engaging projection is engaging with the engaging piece when the output pulley is rotated.

2 Claims, 6 Drawing Sheets

OPERATING DEVICE FOR ACCELERATOR

BACKGROUND OF THE INVENTION

The present invention relates to an acceleration operating device (hereinafter referred to as an operating device) and more particularly, to an operating device having three or more operating systems which are independently operated without interference with each other provided in a lawnmower and the like.

Hitherto, a throttle valve of an engine mounted on a lawnmower and the like is generally controlled with a control cable (hereinafter referred to as a cable). An operating device for operating the cable has three take-up cable pulleys which are rotatably and concentrically supported by one shaft, as disclosed in Japanese Unexamined Patent Publication No. 210336/1983, Japanese Unexamined Utility Model Publication No. 87725/1985, Japanese Examined Patent Publication No. 61054/1990 and Japanese Examined Patent Publication No. 21732/1991. The three pulleys are independently rotatable. One positioned in the medium of the three pulleys, called the "output-pulley", winds a cable connected to a throttle valve. The other pulley, positioned in one side of the output-pulley, called the first pulley, winds a cable for the first operating (hereinafter referred to as the first cable connected to an accelerator pedal. The other pulley, positioned in the other side of the output pulley, called the second pulley, winds a cable for the second operating (hereinafter referred to as the second cable) connected to a power take-off lever, and the like. Generally, each of the first pulley and the second pulley has a return-spring which puts the pulley back in the beginning position thereof when operating force has been cancelled.

Then, the power take-off lever is employed to connect the output portion of the engine with a power take-off shaft (generally called as PTO shaft) and to simultaneously accelerate the engine revolution. The PTO shaft transmits the engine power to an implement.

Cooperation of the output pulley and the first pulleys and cooperating of the output pulley and the second pulley are performed by engaging of engaging projections and engaging holes thereof. Each of the engaging holes is shaped as, for example, circularly elongated slit ("C" shaped hole) so that the engaging projection can be moved, smoothly, through the predetermined angle by pulling the first cable with operating the accelerator pedal. Thereby the output pulley can be rotated, with rotating of the first pulley, by operating the first cable without interfering with the second pulley. On the other hand, the output pulley can be rotated, with rotating of the second pulley, by operating of the second cable, without interfering with the first pulley. Thereby, the output pulley rotates and takes up the output cable so as to increase an opening degree of the throttle valve.

Each of the operating devices of the prior art is provided with only two cables for operating, individually, the output cable through the output pulley to control the engine. In short, the operating device of the prior art is composed of only two operating (input) systems and one output system. In the operating device of the prior art, it is very difficult to add more input system without interference with the two input operating systems. Therefore, the operating device of the prior art can not be used in an engine of the type wherein a choking position of a throttle valve is set on a position where an opening degree of the throttle valve is larger than that in full acceling.

An object of the present invention is to provide an operating device on which three or more input systems can be mounted by utilizing a peripheral surface of an output pulley. Further, the object includes to provide the operating device, having a holding mechanism, to hold an operating degree of a throttle valve on a desired position even if an operating force on the added input system is cancelled.

SUMMARY OF THE INVENTION

According to the present invention, there is provided an operating device for an accelerator comprising: a housing, a shaft fixed on the housing, a first pulley and an output pulley and a second pulley coaxially supported rotatably with the shaft in that order as described above, a first control cable wound or unwound with the first pulley, an output control cable for controlling an engine, wound or unwound by the output pulley, a second control cable wound or unwound by the second pulley, a first return spring for rotating the first pulley in the direction for winding the first control cable, a second return spring for rotating the second pulley, in the direction for winding the second control cable and an accelerator lever supported rotatably on the housing, wherein an engaging latch is projected on the peripheral surface of the output pulley, a first engaging projection is provided on one pulley, either the first pulley or the output pulley, and a "C" shaped first engaging hole in which the first engaging projection is inserted is provided on the other pulley, a second engaging projection is provided on one pulley, either the second pulley or the output pulley, and a "C" shaped second engaging hole, in which the second engaging projection is inserted, is provided on the other pulley, the first engaging projection is capable of moving within the first engaging hole, along the longitudinal direction thereof, and the second engaging projection is capable of moving within the second engaging hole, along the longitudinal direction thereof, and the accelerator lever is provided with an engaging piece engageable with the engaging latch.

In the present invention, the accelerator lever is preferably supported rotatably on the housing in such a state that a friction disc is interpositioned between the accelerator lever and the housing.

In the operating device of the invention, the first pulley can be rotated by pulling the first cable with the accelerator pedal, i.e. when the first pulley rotates, the first engaging projection of the output pulley engages with an end of the first engaging hole of the first pulley so as to rotate the output pulley to pull the output cable for increasing an opening degree of a throttle valve. At that time, the second pulley does not rotate because the second engaging projection of the output pulley moves through the "C" shaped second engaging hole without any interfering. The above-mentioned operation (with the first pulley) is the operation with the first operating system.

On the other hand, when the second cable is pulled, by inclining the power take-off lever and the like, the output pulley is rotated by the rotation of the second pulley, without causing a rotation of the first pulley. Thereby, the opening degree of the throttle valve is increased in the same way as the above-mentioned way. The above-mentioned operation (with the second pulley) is the operation with the second operating system.

In both preceding cases, when the operating force on the accelerator pedal, or on the power take-off lever, is cancelled, the first pulley or the second pulley is returned to the beginning position thereof by the return spring. Thereby, the output pulley can be returned to the beginning position thereof with the output cable, which is pulled by another return spring mounted on the engine side thereof, and the throttle valve is returned to idling position thereof.

In the next, when the accelerator lever is inclined, a latch, provided on the accelerator lever, is engaged with an engaging latch, formed on a peripheral surface of the output pulley, so that the output pulley is rotated directly by the accelerator lever. Then the output cable is pulled and the opening degree of the throttle valve is increased. The above-mentioned operation (with the accelerator lever) is the operation with the third operating system. In the third system of operation, both of the first pulley and the second pulley are not rotated, because both the first engaging projection and the second engaging projection, formed on the output pulley, can move through the first engaging hole and through the second engaging hole without interfering with the first pulley and the second pulley. As described above, in either operating with the first system, the second system or the third system, an engine revolution can be controlled without interfering with other operating systems. Further, if more engaging latches are added on the peripheral surface of the output pulley and more operating members (operating levers and the like) having engaging pieces engageable individually with the engaging latches are added, more operating systems can be added to the operating device.

DETAILED DESCRIPTION

The operating device according to the present invention is explained below with reference to the drawings.

Figure 1:
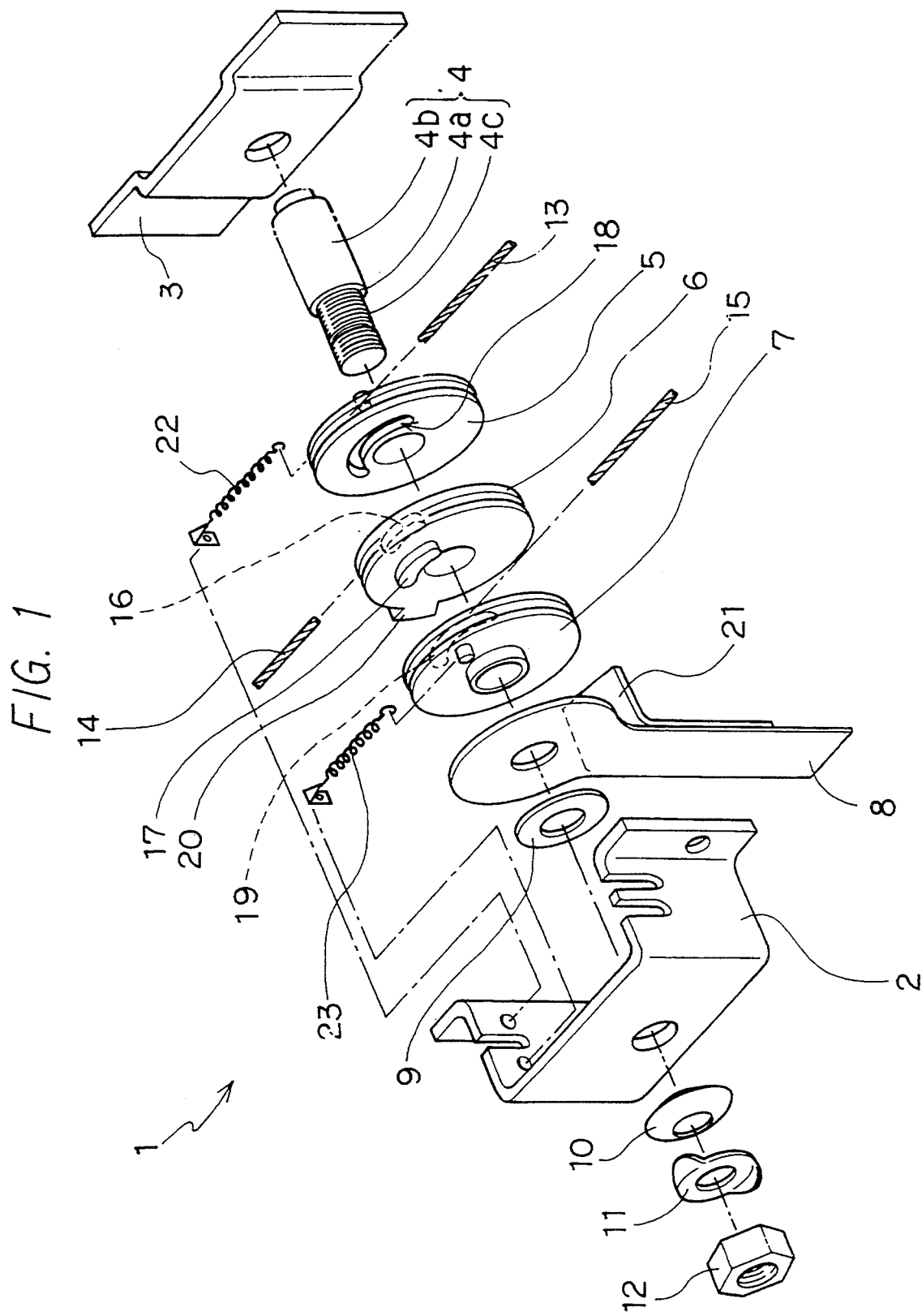
FIG. 1 is an exploded view showing an embodiment of the operating device of the present invention.
Figure 2:
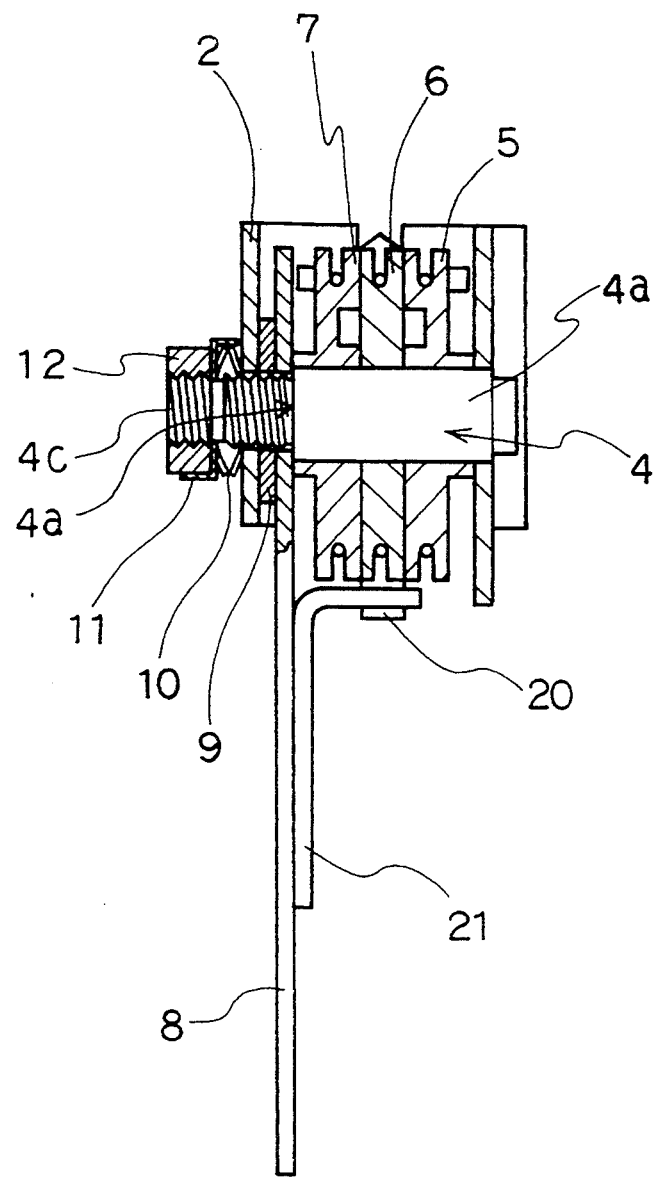
FIG. 2 is a cross-sectional view showing the operating device of FIG. 1 after assembled.
Figure 3:
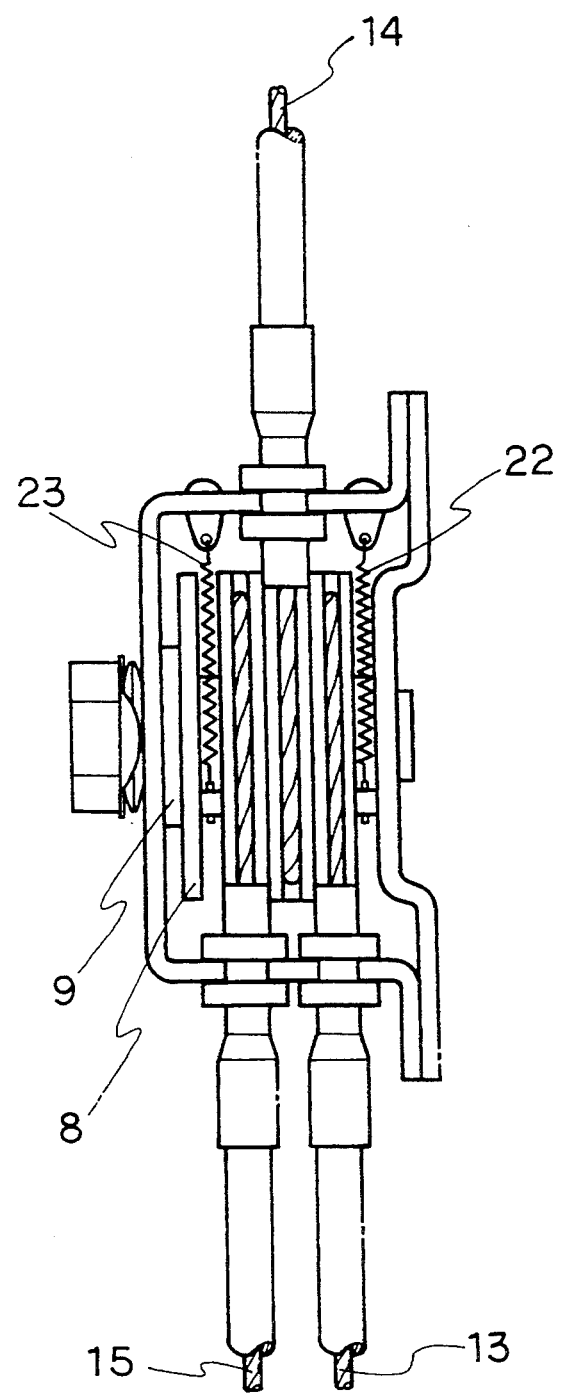
FIG. 3 is a plan view showing the operation device of FIG. 1 after assembled.

In FIGS. 1 to 3, numeral 1 is an operating device in which a first pulley 5, an output pulley 6, a second pulley 7, accelerator lever 8 and a friction disc 9 are independently rotatable and supported with a shaft 4 fixed between a housing 2 and a rear plate 3. The friction disc 9 functions as a slip friction clutch.

As shown in FIG. 2, the shaft is formed to have coaxially a large diameter portion 4b and a small diameter portion 4c. The small diameter portion 4c is threaded. Pulleys 5, 6 and 7 are fitted, rotatably, on the large diameter portion 4b, and the accelerator lever 8 and the friction disc 9 are fitted rotatably on the small diameter portion 4c. And then, on the threaded portion 4c of the shaft 4, a spring washer 10 and a detent washer 11 are fixed with a nut 12 from the outside of the housing 2. Thereby the accelerator lever 8 is pressed against the friction disc 9 between housing 2 and the step portion 4a of the shaft by almost constant pressing force. As result, the accelerator lever 8 can be held at desired inclined position thereof.

A first cable 13, FIGS. 1 and 3, is connected and wound with the first pulley 5 at one end thereof, and is connected with an accelerator pedal (not shown in the drawing) at the other end thereof.

An output cable 14, FIGS. 1 and 3, is connected and wound with the output pulley 6 at one end thereof, and is connected with a throttle valve of an engine (not shown in the drawing) at the other end thereof. A second cable 15 is connected and wound with the second pulley 15 at one end thereof, and is connected with a power take-off lever (not shown in the drawing) at the other end thereof. Further, the output cable 14, FIG. 3, is wound in the different direction from the direction in which the first cable and the second cable are wound.

The output pulley 6 is provided with a first engaging projection 16 on one side surface thereof and with a second engaging projection 17 on the other side surface thereof. The first pulley 5 is provided with a "C" shaped first engaging hole 18 on a side surface thereof facing the output pulley 6. The second pulley 7 is provided with a "C" shaped second engaging hole 19 on a side surface thereof facing the output pulley 6. The first engaging hole 18 is inserted with the first engaging projection 16 and has enough length for the first engaging projection 16 to move through a predetermined angle without interfering. The second engaging hole 19 also is inserted with the second projection 17 and has enough length for the second engaging projection 17 to move through a predetermined angle without interfering.

The output pulley 6 is provided with an engaging latch 20 on a peripheral surface thereof. On the other hand, the accelerator lever 8 is provided with an engaging piece 21 which can be engaged with the engaging latch 20.

The operating device 1 is provided with a return spring 22 for pulling the first pulley 5 in the rotating direction, reverse to the direction in which the first cable 13 is unwound, and is also provided with a return spring 23 for pulling the second pulley 7 in the rotating direction, reverse to the direction in which the second cable 15 is unwound. One end of the return spring 22 is connected with the surface of the first pulley 5 facing the housing 2. One end of the return spring 23 is connected with the surface of the second pulley 7 facing the rear plate 3.

Figure 4:
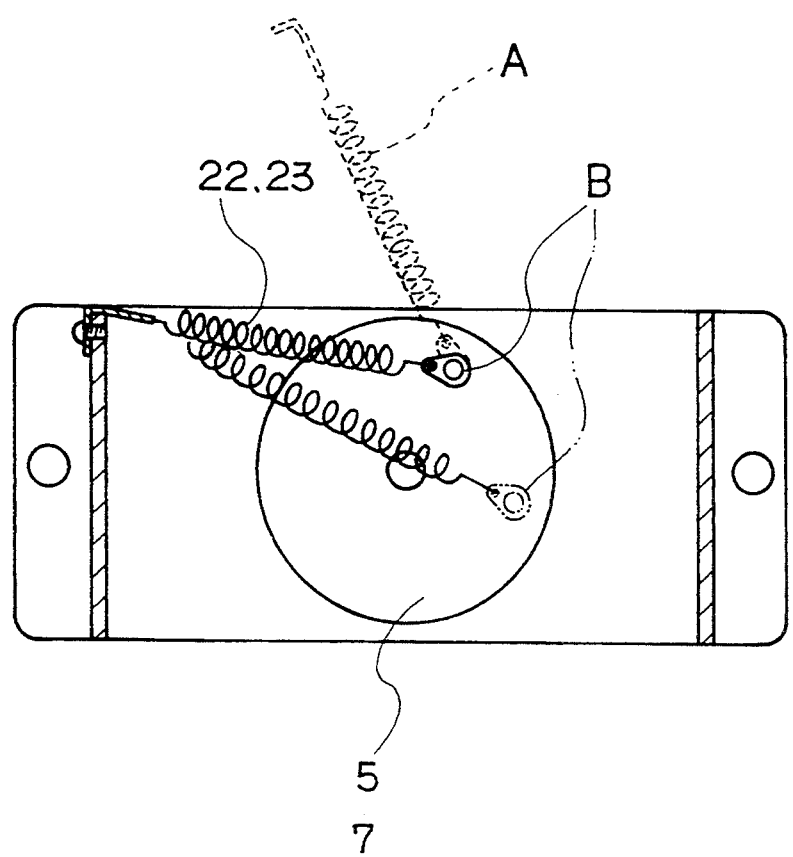
FIG. 4 is a schematic illustration showing a movement of the return spring provided on the operating device of FIG. 1.

Return spring (hereinafter represented by return spring 22) is mounted in such a state that variation of the extension of the spring 22, caused by a rotation of the pulley 5, becomes smaller, as shown with a full line in FIG. 4. That is, the return spring 22 is mounted so that an angle formed between the center axis of the return spring 22 and the line (not shown in the drawing) extending from a point "B" (a connecting point of the return spring to the pulley) before the pulley 5 is rotated to the connecting point "B" after the pulley 5 was rotated through a predetermined angle becomes small. On the other hand, a return spring A of the prior art (Japanese Unexamined Patent Publication No. 21036/1983) shown with a dotted line in FIG. 4 is mounted in such a state that the center axis of the spring A is extended along the above-mentioned line from "B" to "B". As a result, the variation of the extension of the return spring 22 of the embodiment becomes much smaller than that of the prior art wherein the variation of the extension of the return spring A is nearly equal to a moving distance of the connecting point "B". Thereby, in the embodiment, the operating force is not largely varied, and a feeling of operation becomes good.

Figure 6:
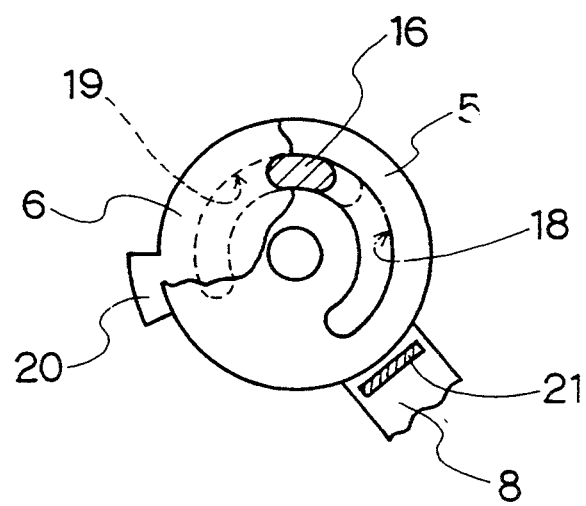
Figure 7:
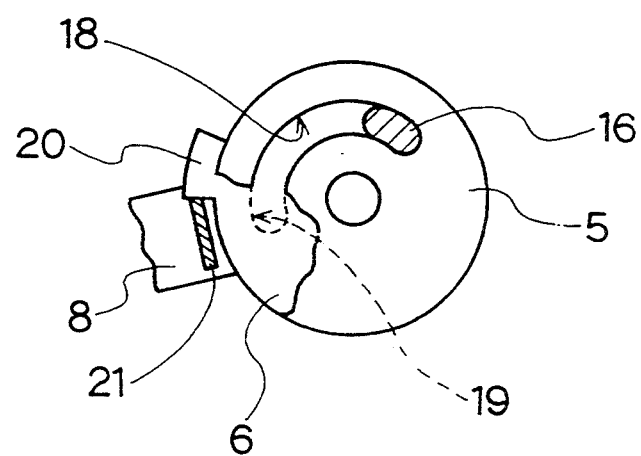

In the operating device, having the above-mentioned composition, an engine can be operated with either operating system of an accelerator pedal, a power take-off lever or an accelerator lever without interference with each other. That will be explained below with reference to FIGS. 5 to 7.

Figure 5:
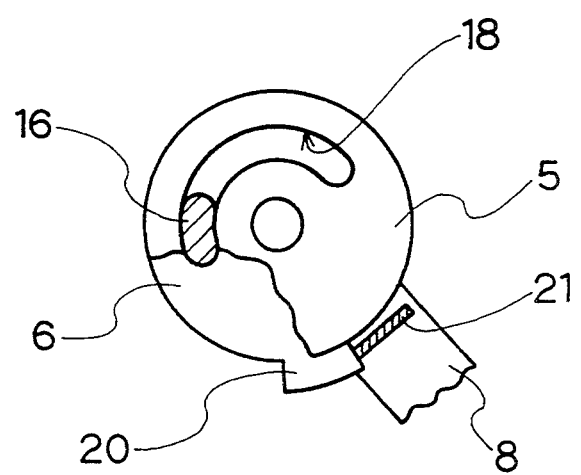
FIGS. 5 to 7 are respectively a schematic illustration showing arrangements of pulleys in the operating device of FIG. 1.

As shown in FIG. 5, when the engine (not shown in the drawing) is in idling state, the first pulley 5 is rotated by pulling of the first cable 13 with the accelerator pedal (not shown in the drawing). At the same time, the output pulley 6 rotates synchronously with the rotation of the first pulley 5 by engaging of the first engaging projection 16 of the output pulley with an end of the first engaging hole of the first pulley 5 (with reference to FIG. 5). Thereby, the output cable 14 is pulled, and the opening degree of the throttle valve (not shown in the drawing) is increased. At that time, the second pulley 7 is not rotated, because the second engaging projection 17 of the output pulley 6 is capable of moving within the second engaging hole 19 (shown with a dotted line in FIG. 6) of the second pulley 7 without any interference. Then, as the output pulley 6 is rotated so that the engaging latch 20 leaves the engaging piece 21 (shown by hatching in FIG. 6) which was kept in contact with the engaging latch 20 before start of rotation of the output pulley 6, the accelerator lever 8 is not inclined at all.

When an operating force for the accelerator pedal is cancelled, the first pulley 5 is returned to the beginning position thereof by return spring 22 (not shown in the drawing). And then, the output pulley 6 is also returned to the beginning position thereof, because another return spring (not shown in the drawing) provided on an end of the output cable 14, connected with the throttle valve, pulls the output cable 14 causing rotation of the output pulley 6. Thereby, an opening degree of the throttle valve returns to the opening corresponding to engine idling.

On the other hand, when the power take-off lever is operated, the output cable 14 is operated to be pulled without rotating the first pulley 5 (in this case, the output cable 14 is pulled by rotation of the second pulley 7 and the output pulley 6).

When the accelerator lever 8 is operated to be inclined, the output pulley 6 is rotated from the position shown in FIG. 5 synchronously with the inclining of the accelerator lever 8, because the engaging piece 21 of the accelerator lever 8 is engaged with the engaging latch 20 of the output pulley 6. Thereby, the output cable 14 is pulled and the opening degree of the throttle valve is increased. Also in this case, both the engaging projections 16, 17 can move circularly within the engaging holes 18, 19 without any interference. Accordingly, neither the first pulley 5 nor the second pulley 7 rotates. When an operator releases the accelerator lever 8, by the function of the friction disc 9, as described above, the accelerator lever 8 is held at the position where lever 8 is released. Then, the output pulley 6, the output cable 14 and the opening degree of the throttle valve are also held at their position where lever 8 is released. The friction disc 9 must be made in such a state that static frictional forces between the friction disc 9 and both the housing 2 and the accelerator lever 8 are stronger than a restoring force of the return spring mounted on the output end of the output cable 14.

Further, the engaging projections 16, 17 and the engaging holes 18, 19 complement each other. Then, the first engaging projection 16 can be provided on the first pulley 5, and the first engaging hole 18 can be provided on the output pulley 6. The second engaging projection 17 can be provided on the second pulley 7, and the second engaging hole 19 can be provided on the output pulley 6.

Another accelerator lever having an engaging piece, can be added on the operating device 1 as occasion demands. In this case, another engaging latch must be added on the peripheral surface of output pulley 6 corresponding to the added engaging piece.

When the operating device 1 is made so that a maximum inclining angle of the accelerator lever 8 and a rotating angle of the output pulley 6, corresponding to the maximum inclining angle of the lever 8, are larger than each of the maximum rotating angle of the first pulley 5 and the maximum rotating angle of the second pulley 7, a choking operation can be operable with the accelerator lever 8, which operation can not be operated with the accelerator pedal, nor the power take-off lever, in order to prevent an accident.

As described above, the operating device of the present invention has one output system and three or more operating (input) systems. With each operating system, it is capable of operating the output system without interfering with other operating systems. Thereby, for example, in a lawnmower, a choking operation, in advance of starting an engine, normal running operation or operation of mowing lawn, and the like, can be easily performed without any miss operating. Further, it is convenient that with reference to at least two operating systems, an opening degree of the throttle valve returns to a beginning position thereof, for example, an idling position thereof, as soon as the operating force is cancelled.

Though several embodiments of the present invention described above, it is to be understood that the present invention is not limited to the above-mentioned embodiments, and various changes and modifications may be made in the invention without departing from the spirit and scope thereof.

What is claimed is:

1. An operating device comprising:
   a housing, a shaft fixed on the housing, a first pulley, an output pulley and a second pulley coaxially rotatably supported on said shaft in that order, a first control cable wound and unwound with the first pulley, an output control cable for controlling the engine, wound and unwound by the output pulley, a second control cable wound and unwound by the second pulley, a first return spring for rotating the first pulley in the direction for winding the first control cable, a second return spring for rotating the second pulley in the direction for winding the second control cable and an accelerator lever supported rotatably on the housing,
   wherein an engaging latch is projected on the peripheral surface of said output pulley, a first engaging projection is provided on one said first pulley and said output pulley, and a "C" shaped first engaging hole in which said first engaging projection engages is provided on the other of said first pulley and said output pulley, a second engaging projection is provided on one of said second pulley and said output pulley and a "C" shaped second engaging hole in which the second engaging projection engages is provided on the other of said second pulley and said output pulley; said first engaging projection is capable of moving within said first engaging hole along the longitudinal direction thereof and said second engaging projection is capable of moving within said second engaging hole along the longitudinal direction thereof, and an accelerator lever is provided with an engaging piece engageable with said engaging latch.

2. The operating device of claim 1, wherein said accelerator lever is supported rotatably on said housing and a friction disc is interpositioned between said accelerator lever and said housing.

* * * * *